Figure 1:
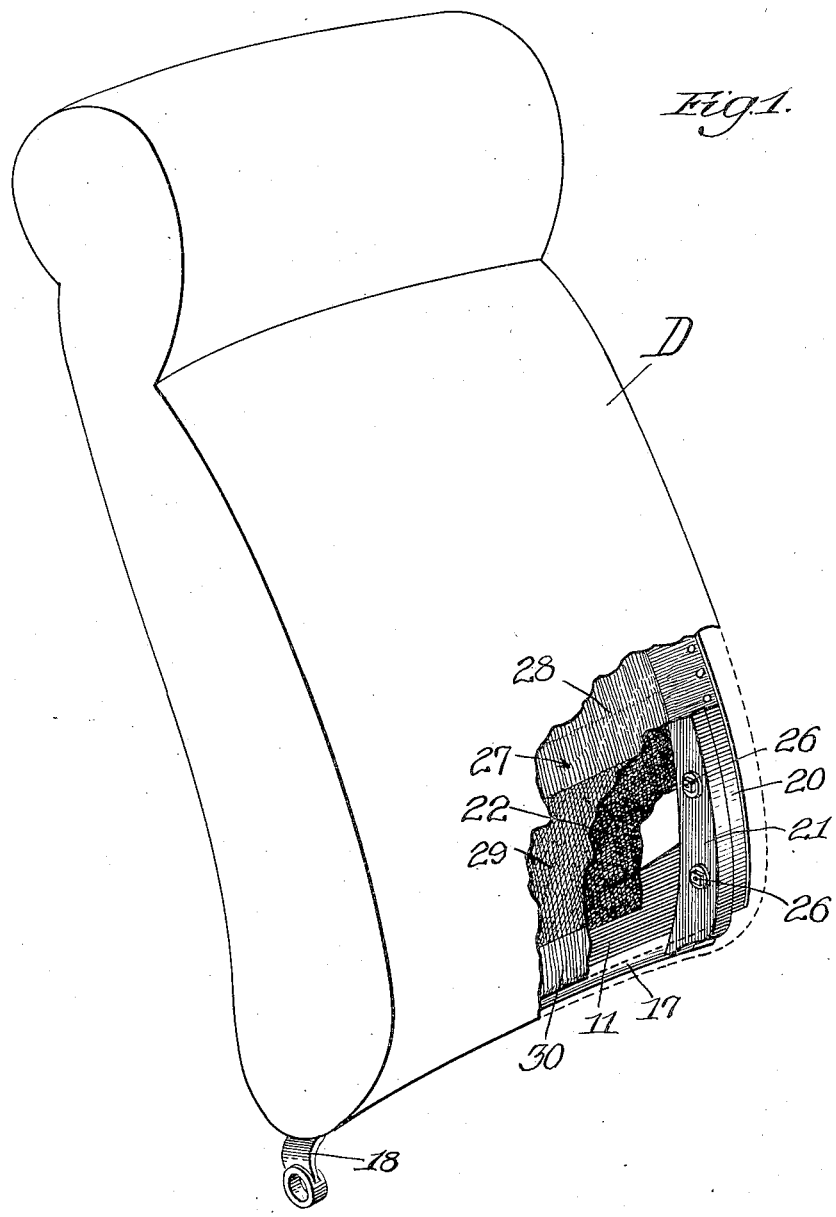

Nov. 29, 1938.  C. A. VAN DERVEER  2,138,314
SEAT BACK
Filed Dec. 29, 1937  3 Sheets-Sheet 1

Inventor,
Clarence A. Van Derveer,
By Chritton, Wiles, Davies, Hirschl & Dawson,
Attys.

Nov. 29, 1938. C. A. VAN DERVEER 2,138,314
SEAT BACK
Filed Dec. 29, 1937 3 Sheets-Sheet 2
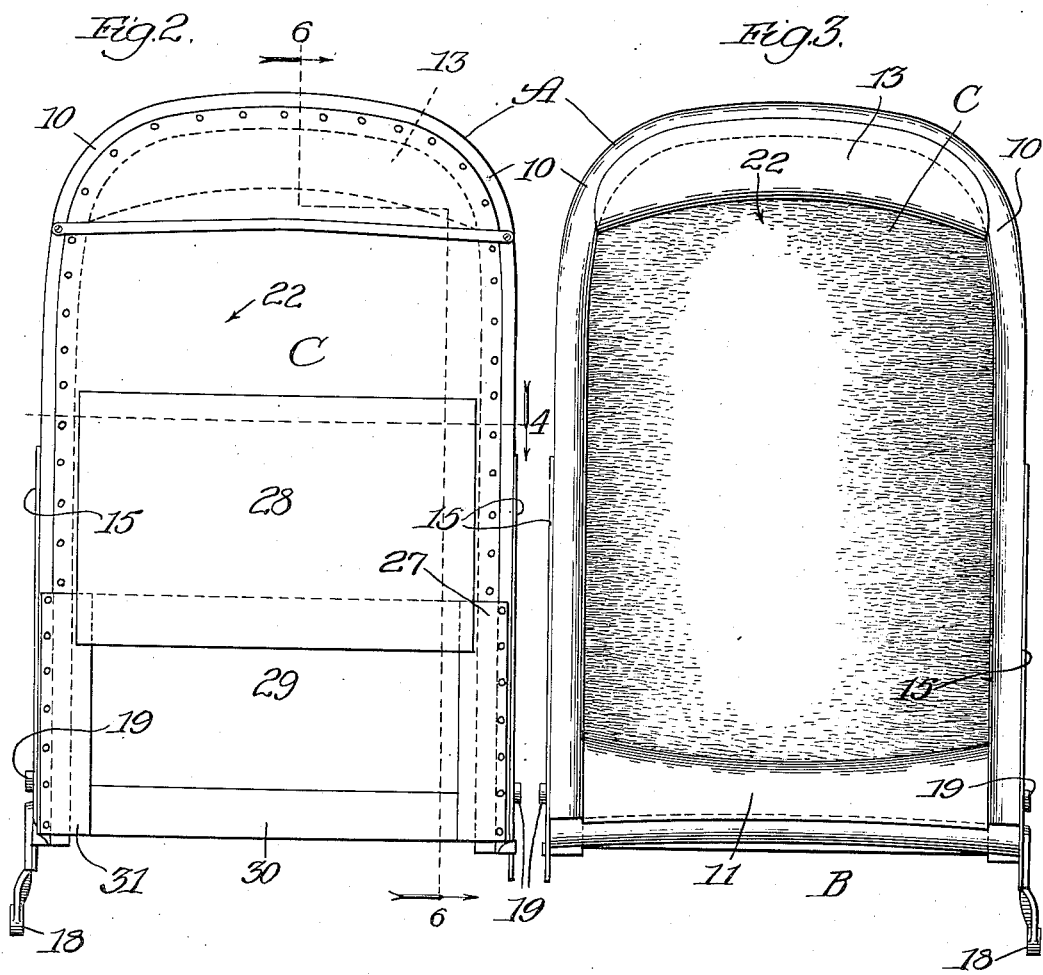
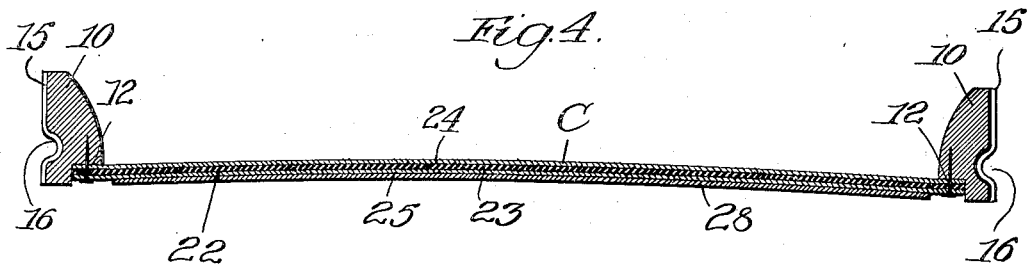
Inventor:
Clarence A. Van Derveer,
By Chritton, Wiles, Davis, Kirschl & Dawson,
Attys.

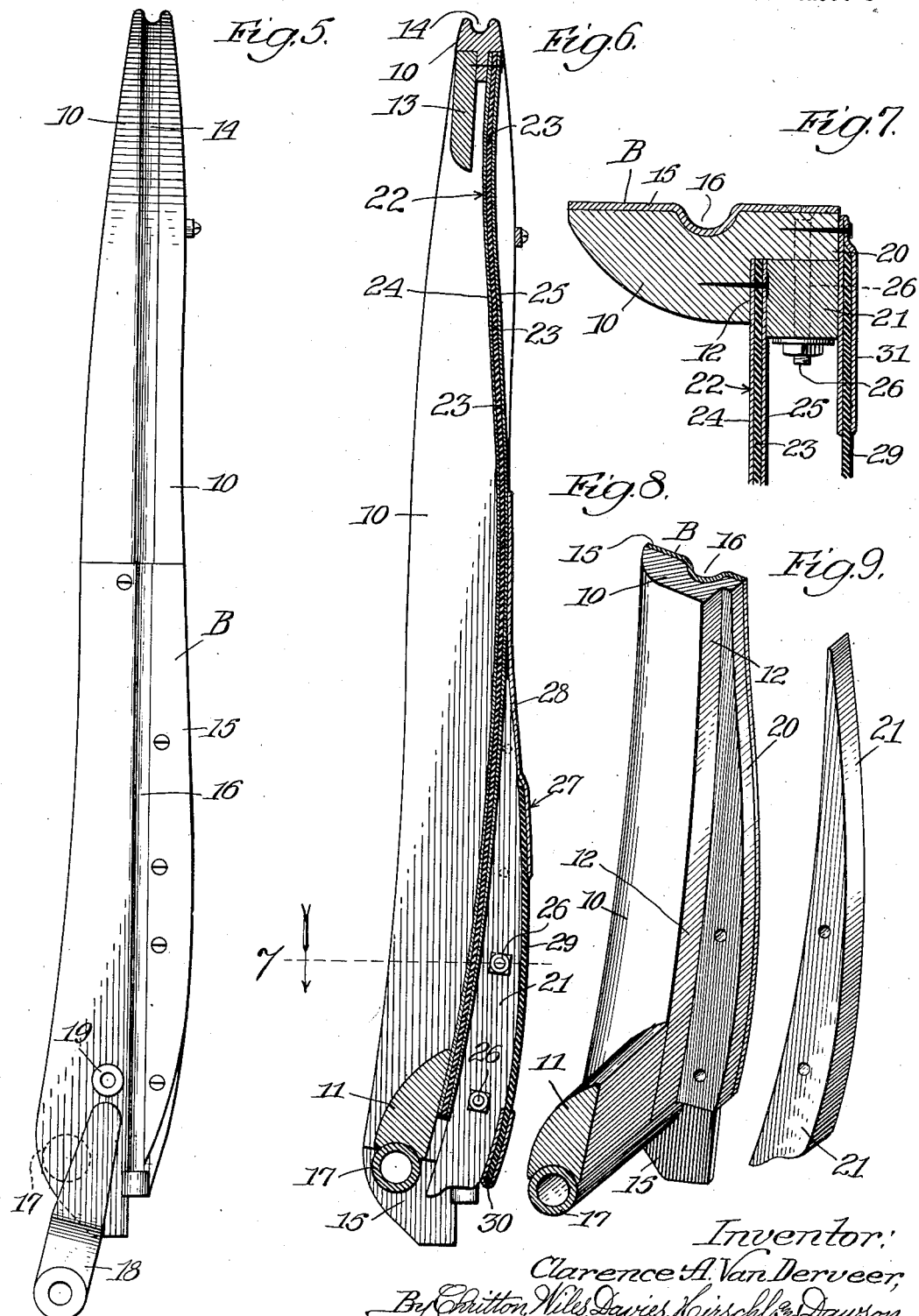

UNITED STATES PATENT OFFICE 2,138,314

SEAT BACK

Clarence A. Van Derveer, Chicago, Ill., assignor to S. Karpen & Bros., Chicago, Ill., a corporation of Illinois Application December 29, 1937, Serial No. 182,343

2 Claims. (Cl. 155—187)

This invention relates to a seat back which is particularly useful for bus and railroad seats, although the invention is useful also for other types of seats.

In reclining seats of the type now in use, it often happens when the back is reclined and a person throws himself into the seat that he strikes his spine on the bottom rail of the back. Also, when the bus strikes some heavy obstruction so as to jar the bus frame severely, similar injuries occur. An object of this invention is to provide a seat back with means whereby the bottom rail of the back is protected by spaced resilient means supported in front of it. A further object is to provide a seat back of simple and sturdy construction whereby a plurality of belts is employed, one of the belts serving as a shock absorber to prevent injury by contact with the frame of the seat back. Other specific objects and advantages will appear as the specification proceeds.

The invention is illustrated, in a preferred embodiment, by the accompanying drawings in which—

Figure 1 is a perspective view of a seat back embodying my invention, a portion of the seat back being broken away; Fig. 2, a front view in elevation of the seat back frame, the upholstery being removed; Fig. 3, a rear view in elevation of the seat back; Fig. 4, a transverse sectional view, the section being taken as indicated at line 4 of Fig. 2; Fig. 5, a side view in elevation of the seat back; Fig. 6, a vertical sectional view, the section being taken as indicated at line 6 of Fig. 2; Fig. 7, a transverse sectional detail view, the section being taken as indicated at line 7 of Fig. 6; Fig. 8, a perspective detail view of a lower portion of the frame; and Fig. 9, a perspective view of the spacing block employed.

In the illustration given, A designates the frame of the back; B, the metal member secured to the lower portion of the back; C, the webbing employed; and D, the upholstery.

In the illustration given, the frame A comprises a wooden yoke member 10 of the shape illustrated more clearly in Fig. 3. At its lower side, it is joined by a bottom rail 11. The yoke 10 is provided at its rear side with a recess 12 to which the webbing C or parts thereof may be secured, as will be later described. A top rail 13 is secured within the curved portion of the member A at the top thereof.

The member 10 is provided with a groove 14 which extends thereabout and which provides means (not shown) for connecting the upholstery D to the frame 10.

The metal reinforcing member B may be of any suitable construction. In the illustration given, the member comprises side plates 15 provided with grooves 16 aligned with groove 14. The plates 15 are connected by a tube 17 which is welded to the plates 15. Also secured to plates 15 is a depending member 18 which is adapted to be engaged by means for adjusting the position of the seat. Since this part forms no part of the invention, it will not be described in detail. The plates 15 are secured to the wooden frame 10 by screws or other suitable means. Welded to each of the plates 15 is a hub member 19 by which the back may be obviously supported upon the seat frame.

The lower portion of frame 10 on its forward side is provided with a forwardly curved portion 20, the front face of which is spaced a substantial distance ahead of the recess 12. Thus at the lower part of the frame, the distance between the front face of the yoke 10 and the ledge or recess 12 is much greater than at the top portion of the frame, as illustrated more clearly in Figs. 4, 7 and 8. Spacer blocks 21, as illustrated in Fig. 9, are formed so as to fit snugly within the space over ledge 12 at the lower portion of the frame 10 and lying adjacent the forwardly extending portion 20.

The resilient belts employed may be of any suitable construction. As shown in Figs. 2, 6 and 7, I provide a main or rear belt 22 which, in the illustration given, comprises a central portion 23 of rubber and enveloping fabric sheets 24 and 25. This type of elastic belt permits a yielding within certain limits, the fabric members preventing undue yielding of the central sheet 23. It will be understood that any other suitable type of resilient material may be employed. The sheet 23 is secured within the recess or ledge 12, as shown in Figs. 2, 6 and 7. In the lower portion of the seat back, the belt is locked against the recess by the spacer blocks 21 which are bolted to the side portions 20, the bolts being indicated by the numeral 26.

I provide a second belt 27 which, in the illustration given, is shown supported at the lower forward side of the frame member 10. The belt 27 comprises at its upper side a fabric member 28, and at the lower side a rubber belt 29. The rubber belt is provided at its lower side with a reinforced fabric strip 30 and along its sides is provided with fabric reinforcements 31. I prefer to secure the fabric member 28 to the central portion of belt 22 by suitable rubber or other adhesives, and likewise I secure the lower portion of fabric member 28 to the upper portion of the rubber belt 29. As shown in Figs. 2 and 7, the belt 29 is secured at its lower side to the portions 20 of the frame member 10 and is buttressed by the spacer blocks 21. If desired, the belt 29 may also be secured directly to the spacer blocks 21.

*Operation*

The parts are assembled as already described with the main rear belt 22 secured along the ledge 12 in member 10, and the front belt 29 is secured at the forward bulging portion 20 of side 10 with the spacer blocks providing a substantial space between the two belts at their lower side, the two belts being connected at about the middle of the back. The upholstery D is secured to the frame by a well known method which will not be described herein since it forms no part of the present invention.

When the occupant of the chair falls or leans back into the reclined seat, he is prevented from striking the rear back rail 11 or 17 by the lower forwardly spaced belt 29 which thus serves as a cushioning element. The fabric reinforcement 30 prevents an undue yielding of the rubber belt 29 so that it is impossible for the occupant to strike the rear rail 11.

In addition to its function as a protecting member, the short lower belt 29 serves as a cushioning means when the back is in reclined position, presenting a surface much more comfortable for the occupant of the seat.

It will be understood that considerable modification may be made in the details of construction shown. Instead of two belts, it will be understood that one belt may be employed for accomplishing the functions set out, although the two-belt construction is preferred for the additional advantages obtained. Obviously, a large number of changes may be made without departing from the spirit of the invention. The foregoing detailed description has been given for clearness of understanding only and no unnecessary limitations should be understood therefrom, but the appended claims should be construed as broadly as permissible in view of the prior art.

I claim:

1. In a seat back, a frame providing sides and a bottom rail, a webbing secured to said sides, a second webbing secured to a front intermediate portion of said webbing, and means extending forwardly of said bottom rail for supporting the lower portion of said second-mentioned webbing at a spaced distance in front of said bottom rail.

2. In a seat back, a frame providing top, side and bottom rails, a webbing extending the length of said frame and secured thereto, a second webbing secured to a front intermediate portion of said webbing, and means extending forwardly of said bottom rail for supporting the lower portion of said second-mentioned webbing at a spaced distance in front of said bottom rail.

CLARENCE A. VAN DERVEER.